UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

PROCESS OF MAKING MOLDED ARTICLES.

1,286,371.  Specification of Letters Patent.  Patented Dec. 3, 1918.

No Drawing.  Application filed July 3, 1914.  Serial No. 848,805.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Processes of Making Molded Articles, of which the following is a specification.

My invention relates to molding processes, and it has special reference to the manufacture of molded articles from Portland cement and other similar materials.

The object of my invention is to provide a process which may be readily and cheaply practised and which produces molded articles of superior hardness and strength, as compared with the articles which have been molded heretofore from cement.

It is well known that the addition of a solution of sodium silicate or potassium silicate to Portland cement and similar cementitious materials results in a composition that is very hard and strong, upon setting. Such a mixture, however, hardens so rapidly that there is not sufficient time between the mixing and setting of the composition to allow for molding, and therefore, it has not been considered possible to take advantage of the hardness and strength of the cement-silicate mixture in making molded articles.

I have discovered that, if Portland cement and dry powdered sodium silicate or potassium silicate are mixed thoroughly together, with or without the addition of one of the usual dry inert fillers, the mixture may be moistened sufficiently for molding without dissolving the silicate enough to permit it to combine appreciably with the cement. After the articles are molded, they are subjected to further moisture, preferably in the form of steam, whereby the sodium or potassium silicate is caused to dissolve completely and thereby is permitted to combine with the cement and form an indurated mass.

The proportion in which the dry sodium or potassium silicate is added to the cement depends upon the rapidity with which it is desired that the mixture shall harden. I have found that 1% by weight of sodium silicate, or even less than this amount, may be used when the time of hardening is to be retarded as much as possible and when great ultimate hardness is not required. When the mass is to be as hard as possible, and when very rapid hardening is not objectionable, I may use as much as 20% by weight of sodium silicate. The percentages given are based upon the weight of dry cement employed.

The fillers mentioned above may be of any of the materials commonly used for this purpose and these fillers may be incorporated in the cement mixture in any suitable proportions.

The molding material prepared in the manner described above may be handled in any well known or convenient manner, and with any suitable apparatus, for making molded articles. It is, of course, desirable that the amount of liquid present during the molding be kept as low as possible, and the exact amount of moisture necessary in this stage of the process may be readily determined for a given batch of cement by a few preliminary experiments.

In practising my present invention, it is possible to make use of any water-soluble silicate in connection with any cementitious material that can be indurated by means of the soluble silicates. It is therefore to be understood that the foregoing references to sodium silicate and Portland cement are merely illustrative, and that no limitations are to be imposed upon my invention except such as are indicated in the appended claims.

I claim as my invention:

1. A process of making molded articles that comprises making a dry mixture of sodium silicate and Portland cement, moistening the mixture sufficiently for molding but not sufficiently to substantially dissolve the silicate, molding the moistened mass and subjecting the molded articles to the action of steam.

2. A process of making molded articles that comprises making a dry mixture of a water-soluble silicate and Portland cement, moistening the mixture sufficiently for molding but not sufficiently to enable the silicate to react appreciably with the cement, molding the moistened mass, and subjecting the molded articles to the action of steam.

3. A process of making molded articles that comprises making a dry mixture of sodium silicate, Portland cement and a filler, moistening the mixture sufficiently for molding but not sufficiently to enable the silicate to react appreciably with the cement, molding the moistened mass, and subjecting the molded articles to the action of steam.

4. A process of making molded articles that comprises making a dry mixture containing sodium silicate and a cementitious material, the cementitious material constituting the major portion of the total mixture, moistening the mixture sufficiently for molding but not sufficiently to enable the silicate to react appreciably with the cementitious material, molding the moistened mass, and treating the molded articles with steam.

5. A process of making molded articles that comprises making a dry mixture containing a water-soluble silicate and Portland cement and a filler, the cement constituting the major portion of the mixture, adding to the dry mixture only sufficient water to permit the mixture to be molded without permitting the silicate to react appreciably with the cement, molding the moistened mass, and subjecting the molded articles to the action of steam.

6. A process of making molded articles that comprises making a dry mixture of a water-soluble silicate and a cementitious material, the latter constituting the major portion of the mixture, moistening the mixture sufficiently for molding but not sufficiently to substantially dissolve the silicate, molding the moistened mass and subjecting the molded articles to the action of steam.

In testimony whereof, I have hereunto subscribed my name this 30th day of June, 1914.

JAMES P. A. McCOY.

Witnesses:
W. H. KEMPTON,
B. B. HINES.